Figure 1:
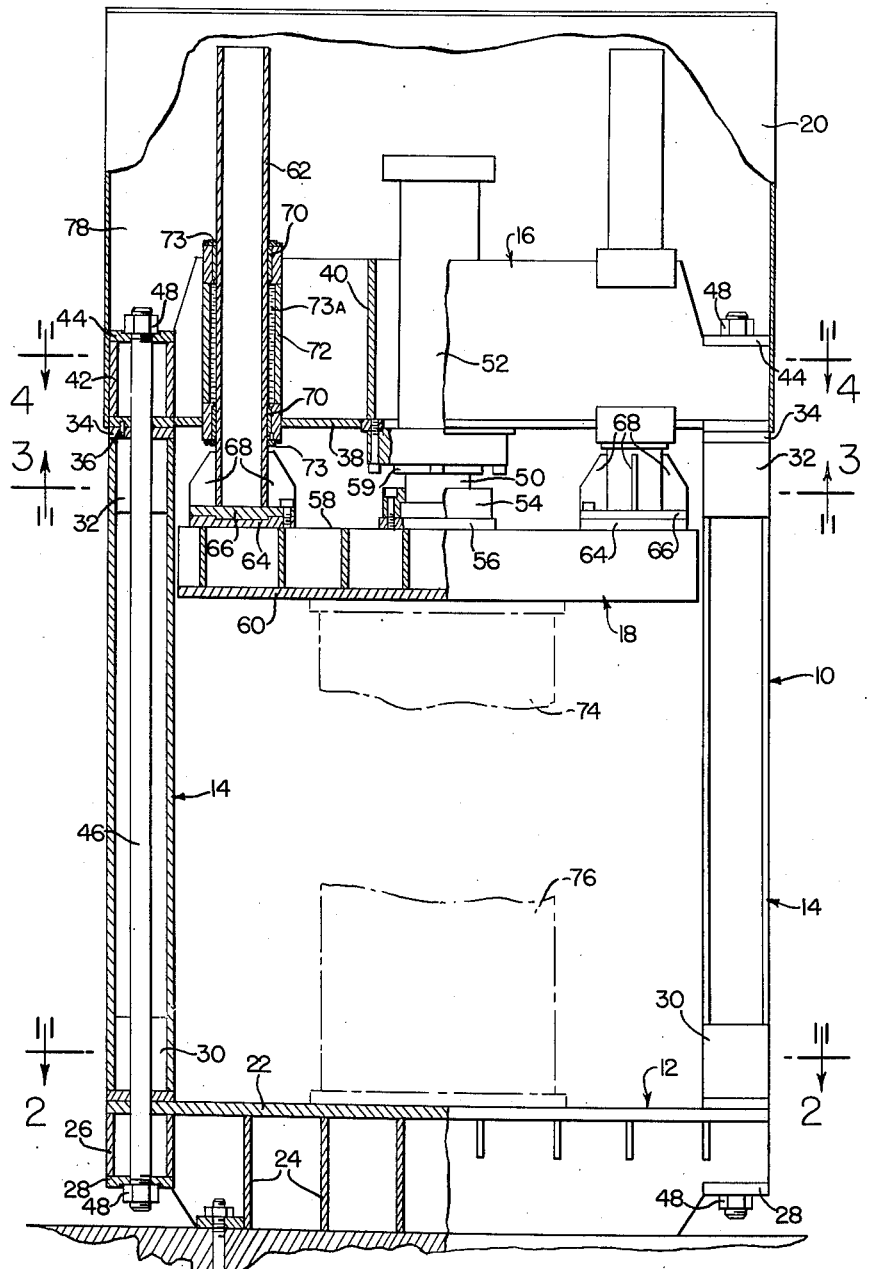

April 24, 1962   J. C. LASKO   3,030,879
PRESS

Filed April 25, 1960   3 Sheets-Sheet 1

INVENTOR.
JOHN C. LASKO

BY Coleman, Ward & Kerr

ATTORNEYS

April 24, 1962  J. C. LASKO  3,030,879
PRESS
Filed April 25, 1960  3 Sheets-Sheet 3

INVENTOR.
JOHN C. LASKO
BY
Colman, Nerf & Kraus
ATTORNEYS

United States Patent Office 3,030,879
Patented Apr. 24, 1962

3,030,879
PRESS
John C. Lasko, Detroit, Mich., assignor to Republic Die & Tool Company, Wayne, Mich., a corporation of Michigan
Filed Apr. 25, 1960, Ser. No. 24,543
7 Claims. (Cl. 100—269)

This invention relates to presses and more particularly to a press having enclosed protected platen guides.

The invention involves a press particularly adapted to hold a set of metal work dies, for spotting purposes among others, the vertically movable upper die being secured to a hydraulically driven platen or holder guided in an upper head. The guide mechanism is fully enclosed and protected in the head against grinding dust removed from the lower work die being spotted, after the upper die has been moved vertically upward away from the work die. At the present time, die spotting presses are provided with side wall gibs and ways that lie substantially fully exposed to the accumulation of grinding dust as the work die is carefully ground down on its high spots. Since these gibs and ways are generally coated with oil and lubricants to ensure smooth travel of the platen, the grinding dust adheres securely to the gib surfaces and ways causing them to wear quickly and in appreciable measure. True alignment of the upper movable platen holding the upper master die and the bed supported work die is lost as soon as the gib surfaces and ways have started to wear down. From that point on, adjustments of the gibs and of the master die is a source of constant annoyance, errors in die spotting, losses in time and a substantial increase in costs.

The press of this invention, in addition to its use as a metal to metal die spotting press is also usable for die spotting with plaster masters, for die tryout purposes, and, if necessary or desirable, as a production press. The scope of application of the inventive press construction and its advantages encompasses all of these presses—die spotting, metal tryout and production types. Although the description given herein is directed principally to die spotting presses, it will be understood that the inventive construction is also applicable to and usable in other types of presses.

The invention here disclosed provides for guide means on the master die holding platen to be fully enclosed and protected when the platen is in its uppermost position, the master die being elevated above the work die so that it can be worked on and ground down. The grinding dust created by this operation passes into the air below the platen, settling to the floor. There are no vertical gibs or ways in the area of the work die upon which this dust can settle, the guide means being fully enclosed and protected above the platen. Not only will such a die spotting press require less or no repair or maintenance to its alignment structure, it will also provide more work space for the die and die makers, a reduction in the time required to work the die down to its required dimensions since adjustments in the gibs and ways are eliminated, and a consequent substantial savings in costs.

It is therefore an object of the invention to provide a press having a vertically movable platen which has its guide structure fully enclosed when in upper retracted position. Another object is the provision of a press in which an upper enclosed head is supported on columns over a press bed, the movable platen being guided entirely in and above the head of the press. A further object is to provide guide means for the movable platen in the form of tubes slidingly mounted in bushings, the tubes and bushings being fully enclosed against exposure to grinding dust flying from the work die when the latter is being spotted.

These and additional objects of the invention and features of construction will become more apparent from the description of the invention given below, in which the terms employed are used for purposes of description only and not of limitation.

Reference is made to the drawings annexed hereto, forming an integral part of this specification, and in which:

FIG. 1 is a vertical elevational view of the inventive die spotting press, partially in section.

Figure 2:
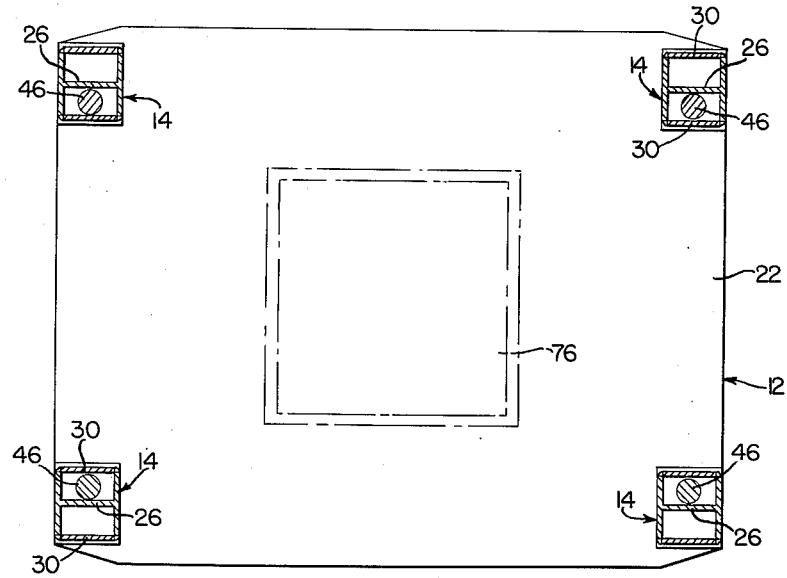
Figure 3:
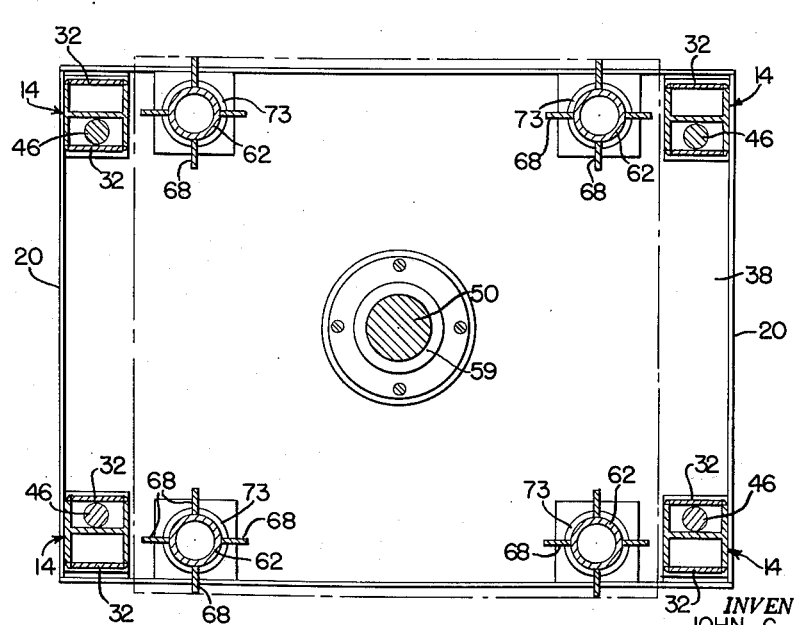
Figure 4:
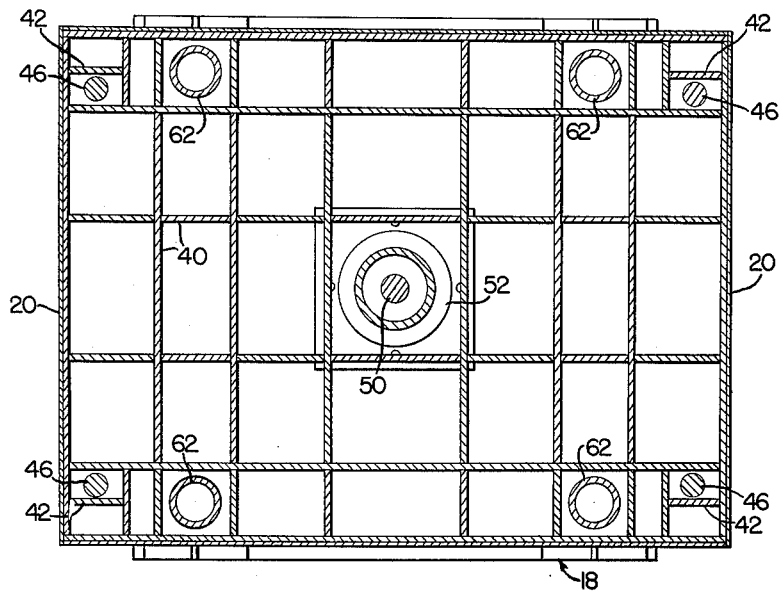

FIGS. 2, 3 and 4 are horizontal sectional views taken substantially on the lines 2—2, 3—3 and 4—4, respectively, of FIG. 1.

Figure 5:
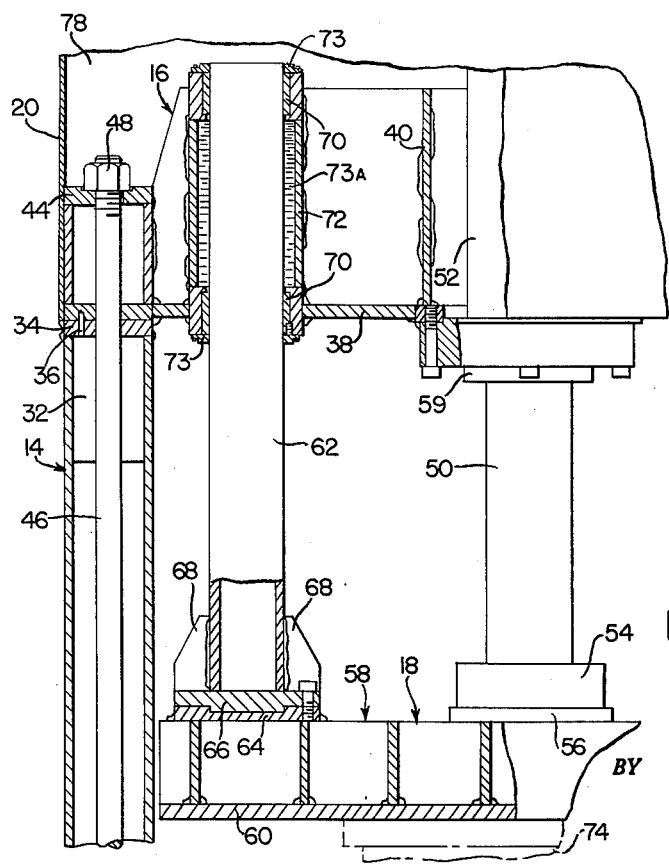

FIG. 5 is a fragmentary enlarged vertical sectional view of that portion of the upper platen and head shown at the left in FIG. 1, with the platen in its lowermost position, the guide tubes being fully enclosed by the guide tube bushings and housing in the head.

As shown in the several views of the drawings, and particularly in FIG. 1, the die spotting press 10 comprises a bed 12, columns 14, a head 16, a vertically movable platen 18, and a cover 20. The press 10 is designed primarily, but not exclusively, for use with metal dies that are brought together directly or upon metal under pressure. In die spotting these pressures may range up to 150 tons. In die tryout and production presses, the pressures applied may be greater.

Bed 12 is fabricated of a metal bed plate 22 surmounting a grid structure 24 and is provided with corner box sections 26 having lower plates 28 elevated above the ground or base line of the bed. The bed plate, grid structure, corner box sections and lower plates are all welded together into an integral bed unit. Current metal fabricating processes are employed to produce each of the elements comprising the bed structure.

H-section columns 14 are positioned vertically at corners of the bed 12, the lower ends of the columns being closed by plates 30 welded across the openings of the H-section and parallel to its web. Similar plates 32 are fixedly secured to the upper ends of the columns 14 adjacent the head 16 and the cover 20. The columns 14 are surmounted by plates 34 mounting pins 36 for locating the head 16 in aligned relationship to the bed 12.

The head 16 comprises a base plate 38 secured to the underside of a grid structure 40 having box sections 42 in the corners thereof overlying the columns 14 and plates 34. Surmounting the box sections 42 are plates 44 fixedly secured thereto. Strain rods 46 tie the head 16, columns 14 and bed 12 together when nuts 48 are threaded thereonto at the upper and lower ends of the rods. The nuts bear against upper plates 44 and lower plates 28 affixed to their respective box sections in the head 16 and bed 12. When so conjoined, the head and bed are positively aligned in parallel and square relationship.

Mounted central of the head 16 is the hydraulically operated ram 50 which is slidingly arranged in the housing 52 secured in the head 16. The exposed or working end of the ram is affixed by a clamp ring 54 to a mounting plate 56 on the upper surface 58 of the platen 18. A wiping ring 59 cleans the ram of foreign particles as it is elevated into its housing 52. The lower surface of the platen comprises a master die mounting plate 60. The platen, as in the case of the bed 12 and head 16, is also formed as a grid structure for rigidity and reduced weight.

Adjacent the four corners of the platen 18 are affixed guide tubes 62, secured to mounting plates 64 welded or otherwise fixedly attached to the platen. The guide tubes, as shown in FIGS. 1 and 5, are secured to a lower plate member 66 by radial fins 68 in upstanding relationship to the platen. The guide tubes 62 are slidingly mounted in upper and lower bearings 70 held in a shell 72 which is secured in the plane of and to the head 16. The guide tubes are of a length such that when the platen is lowered to its lowermost position, as in FIG. 5, the tubes lie fully in both bearings 70, so that positive alignment of the platen is assured. Wiping or seal rings 73, at the upper and lower ends of the shells 72, clean the exteriors of the tubes of any foreign particles that may adhere thereto when the tubes are exposed outside of the head 16, upon return of the tubes into their elevated protected positions. Lubricant 73a, disposed within the shells 72 and about the guide tubes 62, maintains full lubrication of the tubes at all times.

By arranging the guide tubes 62 at the outer corners and the ram 50 central of the platen 18, the platen is lowered and raised in true parallel with the head 16 and bed 12. The farther apart that the guide tubes 62 are placed, the greater will be the accuracy of the press. At the same time, when the platen 18 is lowered the guide tubes 62 come into exposed position below the head 16. But at this time the master die 74 is being moved into spotting contact with the work die 76, and no work is being done upon the work die. Later, when the spotting has been effected upon the work die and the platen raised, the guide tubes are elevated into the closed chamber 78 created by the cover 20 over the head 16, the guide tubes 62 and the bearing shells 72. When so elevated, the guide tubes and ram are fully protected against the metal dust raised by grinding off the high spots revealed in the spotting phase of the operation of the press.

The guide tube bearing housing or shell 72, i.e. the bearing enclosure from one end to the other, is of a length equal to or greater than the length of the stroke of the press. The travel of the platen should not exceed the longitudinal distance between the ends of the guide tube bearings. To increase the travel beyond such dimension could subject the platen to possible cocking or rocking as the upper die bears under pressure upon the lower die, or upon metal therebetween. By maintaining the travel-bearing length ratio at from less than and up to 1:1, the squareness of the platen and rigidity of the press, during pressure bearing operations of the dies, is assured.

The hydraulic motor mechanism associated with the ram 50 and its housing 52 is not shown. Such mechanism is commercially available and may be disposed upon the head 16 within the confines of the cover 20, or be associatedly conjoined to the ram 50 from without the cover 20. Or, alternatively, the ram may be driven by a screw mechanically from a motor or other drive source. The controls for the power drive also are not shown, being of usual commercial construction, design and connection to the drive mechanism.

In operation, the master die 74 with and upon the work die 76 are placed on the bed plate 22. The master die is then secured to platen plate 60 in a usual manner, as by mounting screws through a die support plate to the plate 60 in lowered position, as shown in FIG. 5. In this lowered position, the guide tubes 62 have portions exposed to the atmosphere within the peripheral limits of the press. However, in this position, no work can be done upon the work die 76 which is in spotting, touching relationship with the master die 74 immediately thereabove.

The platen 18 is then elevated by the ram 50, guide tubes 62 moving upwardly into the chamber 78 formed by the cover 20 and the head plate 38. When in the chamber 78 and within the confines of the bearing housing 72 and bearings 70, the guide tubes 62 are fully protected against the destructive effects of the metal dust generated in grinding off high spots from the work die revealed in spotting the work die with the master die. According to general practice in this art, spotting is effected by first coating the master die with a bluing or blue stain or pigment, lowering the master die into touching contact with the work die, and checking to see where bluing has adhered to the work die. These spots or areas represent the high spots on the work die. The high spots are ground down until contact between the dies causes a deposit of bluing over the entire surface of the work die. The master die is the female component of the die set, the work die being the male component.

The guide tubes 62 and ram 50 are therefore fully protected when the grinding dust is flying about in the air adjacent the press. This dust being materially heavier than the air settles rapidly out of the way onto the floor and the bed of the press. When the platen is again lowered, the dust is on the floor where it cannot adhere to the guide tubes 62. The inventive construction here disclosed permits the press to operate with a minimum of maintenance and repair to those elements that are usually and regularly subject to substantial repairs in die spotting presses heretofore available. Such savings which are and can be effected by the inventive construction are substantial, not only in terms of the machine itself but even more in respect to minimum down time and the increased amount of work that the machine permits its operators to turn out.

The several elements, components and subassemblies heredisclosed are made of metal. The structural components such as the grid structures may be cast or weldments; the columns, plates and rods are preferably rolled sections; the tubular members may be seamless or welded units. Each of the subassemblies such as the bed 12, the head 16, the platen 18 are weldments, to obtain greater strength and rigidity.

Having described the invention in its simplest terms, it is to be understood that the features of construction can be changed and varied in greater or lesser degree without departing from the essence of the invention defined in the appended claims.

I claim:

1. In a press construction, a bed, a head comprising a grid of conjoined vertical members forming cells therebetween, columns supporting said head in spaced parallel alignment over said bed, means conjoining said head to said bed, a platen movable between said head and said bed supported by said head, platen guide members mounted on said platen slidingly movable in said head, bearing means for said platen guide members in selected cells of said grid and secured thereto and extending transversely through said head, means associatedly conjoined to said platen and mounted in said head above said platen to lower and elevate said platen, a base plate secured to the lower side of said head and adjacent said platen guide members and said platen means to lower and elevate said platen whereby said head is closed on its lower side, and a cover secured about said head adjacent said base plate and surmounting and enclosing said guide members and said means to lower and elevate said platen when said platen is elevated to a position adjacent said head.

2. In a press construction, a bed, a head comprising a grid of conjoined vertical members forming cells therebetween, columns supporting said head above said bed in spaced parallel alignment, the tie rods conjoining said head to said bed, a platen vertically movable between said head and said bed slidingly supported by said head, platen guide members affixed to said platen thereabove slidingly movable in said head, bearing means for said platen guide members in selected cells of said grid and secured thereto and extending transversely through said head, hydraulic means mounted on and through said head and secured to said platen to lower and elevate said platen, a base plate secured to the lower side of said head and adjacent said platen guide members and said hydraulic means to lower and elevate said platen whereby said head is closed on its lower side, and a cover secured about and above said head adjacent said base plate in capping relationship and surmounting and enclosing said platen guide members and said hydraulic means when said platen is elevated to a position adjacent said head.

3. In a press construction, a bed, a head comprising a grid of conjoined vertical members forming cells therebetween, columns supporting said head above said bed in spaced parallel alignment, tie rods conjoining said head to said bed, a platen vertically movable between said head and said bed slidingly supported by said head, platen guide members affixed to said platen thereabove, bearing shells for said guide members secured in selected cells in said head and extending transversely through said head, said platen guide members being slidable in said bearing shells, hydraulic means mounted on and through said head and secured to said platen in supporting relationship thereto to lower and elevate said platen, a base plate secured to the lower side of said head and adjacent said platen guide members and said hydraulic means to lower and elevate said platen whereby said head is closed on its lower side, and a cover secured about and above said head adjacent said base plate in capping relationship and surmounting and enclosing said platen guide members and said hydraulic means when said platen is elevated to a position adjacent said head, said platen guide members being embraced by said bearing shells at every position of said platen, the travel of said guide members from a position when said platen is adjacent said head to the end of its stroke being no greater than the length of said bearing shells.

4. In a press construction for spotting and finishing dies,
   a bed adapted to support a lower die unit,
   a head comprising an integral grid of conjoined vertical members forming elongated cells therebetween,
   columns supporting said head above said bed in spaced parallel alignment and conjoining said head and said bed,
   a platen adapted to support an upper die unit vertically movable between said head and said bed slidingly supported by said head,
   platen guide members affixed to said platen thereabove,
   bearing shells for said platen guide members in selected cells of said grid and secured thereto and extending transversely through said head,
   said platen guide members being slidable in said bearing shells,
   hydraulic means mounted on and transversely through said head in a selected cell of said grid and secured to said platen to lower and elevate said platen,
   a base plate secured to the lower side of said head and adjacent said platen guide members and said hydraulic means to lower and elevate said platen whereby said head is closed on its lower side,
   and a cover secured about and above said head adjacent said base plate in capping relationship and surmounting and enclosing said head, said platen guide members and said hydraulic means when said platen is elevated to a position adjacent said head, whereby when said upper die unit is lowered into die spotting contact with said lower die unit said platen guide members are exposed below said head, and when said platen is elevated to a position adjacent said head said platen guide members are enclosed by said bearing shells, said base plate and said capping cover and protected against exposure to destructive foreign matter generated by the die finishing operation.

5. In a press construction,
   a bed adapted to support a lower die unit,
   a head over said bed,
   columns supporting said head in spaced parallel alignment and conjoining said head and said bed,
   a platen adapted to support an upper die unit vertically movable between said head and said bed slidingly supported by said head,
   platen guide members affixed to said platen thereabove,
   bearing means for said platen guide members secured in and extending transversely through said head,
   said platen guide members being slidable in said bearing means,
   means mounted on and extending transversely through said head and secured to said platen to lower and elevate said platen,
   a base plate secured to the lower side of said head and adjacent said platen guide members and said platen means to lower and elevate said platen,
   and a capping cover secured about and above said head adjacent said base plate, and surmounting and enclosing said head, said platen guide members and said means to elevate and lower said platen,
   said platen guide members being embraced by said bearing means at every position of said platen, the travel of said guide members for the stroke of said platen being no greater than the length of said bearing shells.

6. In a press construction, a bed, a head comprising a grid of conjoined vertical members forming cells therebetween, columns supporting said head in spaced parallel alignment over said bed, means conjoining said head to said bed, a platen movable between said head and said bed supported by said head, platen guide members mounted on said platen slidingly movable in said head, bearing means for said platen guide members in selected cells of said grid and secured thereto and extending transversely through said head, said bearing means located at the outer corners of said head adjacent said columns, means associatedly conjoined to said platen and mounted in said head above said platen to lower and elevate said platen, a base plate secured to the lower side of said head and adjacent said platen guide members and said means to lower and elevate said platen whereby said head is closed on its lower side, and a cover secured about said head adjacent said base plate and surmounting and enclosing said guide members and said means to lower and elevate said platen when said platen is elevated to a position adjacent said head.

7. In a press construction,
   a bed adapted to suport a lower die unit,
   a head over said bed,
   columns supporting said head in spaced paralel alignment and conjoining said head and said bed,
   a platen adapted to support an upper die unit vertically movable between said head and said bed slidingly supported by said head,
   platen guide members affixed to said platen thereabove,
   bearing means for said platen guide members secured in and extending transversely through said head and located adjacent the outer corners of said head,
   said platen guide members being slidable in said bearing means, means mounted on and extending transversely through said head and secured to said platen to lower and elevate said platen,
   a base plate secured to the lower side of said head and adjacent said platen guide members and said means to lower and elevate said platen,
   and a capping cover secured about and above said head adjacent said base plate and surmounting and enclosing said head, said platen guide members and said means to elevate and lower said platen,
   said platen guide members being embraced by said bearing means at every position of said platen, the travel of said guide members for the stroke of said platen being no greater than the length of said bearing shells.

References Cited in the file of this patent

UNITED STATES PATENTS

| 1,149,518 | Holmes | Aug. 10, 1915 |
| 2,185,096 | Treer | Dec. 26, 1936 |
| 2,387,839 | Frost | Oct. 30, 1945 |
| 2,502,072 | Bender | Mar. 28, 1950 |
| 2,587,076 | Verson et al. | Feb. 26, 1952 |
| 2,820,250 | Stratton | Jan. 21, 1958 |
| 2,869,177 | Jurgeleit | Jan. 20, 1959 |

FOREIGN PATENTS

| 1,149,949 | France | July 29, 1957 |
| 1,170,811 | France | Sept. 29, 1958 |